UNITED STATES PATENT OFFICE.

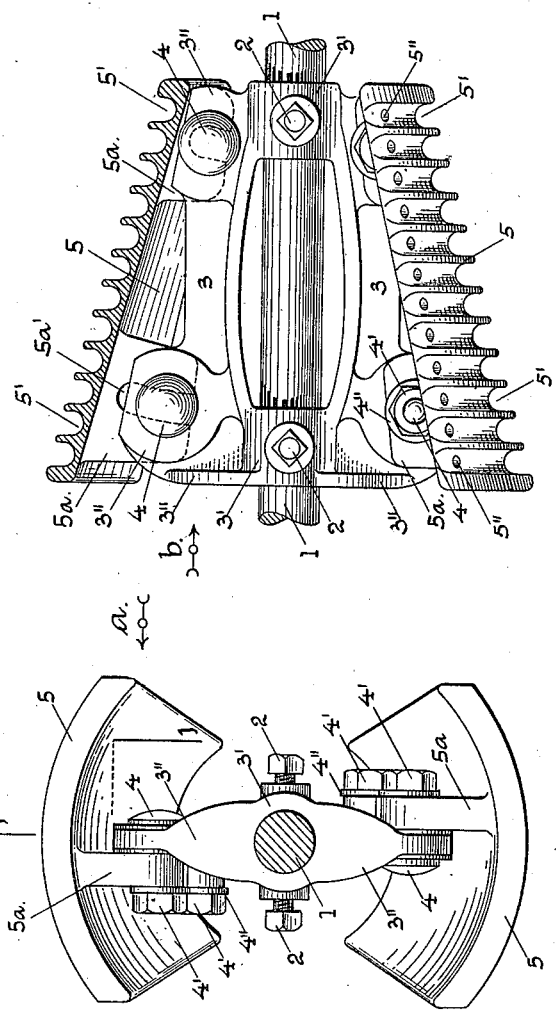

LAWRENCE B. JENCKES, OF WORCESTER, MASSACHUSETTS, ASSIGNOR TO CROMPTON & KNOWLES LOOM WORKS, A CORPORATION OF MASSACHUSETTS.

EXPANSIBLE PULLEY.

964,161.  Specification of Letters Patent.  Patented July 12, 1910.

Application filed November 12, 1907. Serial No. 401,834.

*To all whom it may concern:*

Be it known that I, LAWRENCE B. JENCKES, a citizen of the United States, residing at Worcester, in the county of Worcester and State of Massachusetts, have invented certain new and useful Improvements in Expansible Pulleys, of which the following is a specification.

My invention relates to expansible pulleys, and particularly to a cone-shaped expansible pulley.

The object of my invention is to provide a cone-shaped expansible pulley of improved construction, and particularly adapted to be used on the harness motion of a loom, the straps from the harnesses passing over said pulley, and the ends thereof attached thereto.

My invention consists in certain novel features of construction of my expansible pulley as will be hereinafter fully described.

Referring to the drawing:—Figure 1 is a side view of the pulley shown in Fig. 2, looking in the direction of arrow $a$, same figure, with one side shown in section, on line 1, 1, Fig. 2. Fig. 2 is an end view of the pulley shown in Fig. 1, looking in the direction of arrow $b$, same figure.

In the accompanying drawing, 1 is a rotatable shaft. On the shaft 1 is secured, in this instance by set screws 2, the hubs 3′, (in this instance two hubs) of a casting or frame 3, on which are the outwardly extending arms 3″, having openings therethrough for the bolts 4.

My expansible pulley consists in this instance of two plates or shells 5, each of which has a convexed cone-shaped exterior surface, provided in this instance with a series of concaved recesses or depressions 5′ therein for the harness straps, not shown, leading to the harnesses, (not shown,) or for other connections, and also in this instance holes 5″ therein, for attaching the ends of the harness straps, or other connections. Each plate or shell 5 has in this instance inwardly extending lugs or projections $5^a$, which have open end slots $5^{a\prime}$ therein, to receive the attaching bolts 4, which extend through said open end slots $5^{a\prime}$, and are secured therein by nuts 4′ on the ends of the bolts 4. A washer 4″ extends between the lug $5^a$ and the nut 4′.

The casting or frame 3 is adjustable longitudinally on the shaft 1, if desired, and the two plates or shells 5 of the pulley, are adjustable toward or away from each other, at each end, to diminish or increase the diameter of the pulley, making said pulley an expansible pulley.

It will be understood that the details of construction of my improvements may be varied if desired.

Having thus described my invention, what I claim as new and desire to secure by Letters Patent is:

An expansible cone-shaped pulley, comprising a frame adapted to be mounted on a shaft, and having outwardly extending arms with openings therethrough for attaching bolts, and a plurality of plates or shells, each having a convexed cone-shaped exterior surface, with a series of recesses or depressions therein, and inwardly extending lugs or projections having slots therein, to receive the attaching bolts, and said bolts.

LAWRENCE B. JENCKES.

Witnesses:
 JOHN C. DEWEY,
 ARTHUR K. HUTCHINS.